(12) United States Patent
Cox et al.

(10) Patent No.: US 12,201,133 B2
(45) Date of Patent: Jan. 21, 2025

(54) DRY FOOD MIX

(71) Applicant: General Mills, Inc., Minneapolis, MN (US)

(72) Inventors: Steven J Cox, Long Lake, MN (US); David J Domingues, Plymouth, MN (US); Karin C Gaertner, Andover, MN (US); Nicole Madden, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 808 days.

(21) Appl. No.: 17/322,998

(22) Filed: May 18, 2021

(65) Prior Publication Data

US 2021/0368836 A1    Dec. 2, 2021

Related U.S. Application Data

(60) Provisional application No. 63/030,667, filed on May 27, 2020.

(51) Int. Cl.
| | |
|---|---|
| *A23L 29/30* | (2016.01) |
| *A23L 5/30* | (2016.01) |
| *A23L 25/00* | (2016.01) |
| *A23L 29/00* | (2016.01) |
| *A23L 33/00* | (2016.01) |
| *A23L 33/115* | (2016.01) |
| *A23L 33/125* | (2016.01) |

(52) U.S. Cl.
CPC .............. *A23L 25/30* (2016.08); *A23L 5/30* (2016.08); *A23L 29/015* (2016.08); *A23L 29/30* (2016.08); *A23L 33/115* (2016.08); *A23L 33/125* (2016.08); *A23L 33/40* (2016.08)

(58) Field of Classification Search
CPC ... A23V 2250/60; A23L 29/30; A23L 33/125; A23L 5/40; A23L 33/40; A23L 33/15; A23G 3/00
See application file for complete search history.

(56) References Cited

U.S. PATENT DOCUMENTS 4,358,469 A * 11/1982 Lavie .................. A23G 3/0231
127/29

FOREIGN PATENT DOCUMENTS

WO    WO 2006/118828    11/2006

OTHER PUBLICATIONS

Food and Tools, Nut Brittle with Dried Rose Petals and Vanilla Salt, Jul. 16, 2012, pp. 1-6 (Year: 2012).*
Curious Cook, Caramelization: New Science, New Possibilities, Sep. 12, 2012, pp. 1-7 (Year: 2012).*
Harvard Health Publishing, Are Certain Types of Sugars Healthier Than Others? Oct. 20, 2023, pp. 1-8 (Year: 2023).*

(Continued)

*Primary Examiner* — Hong T Yoo
(74) *Attorney, Agent, or Firm* — Jordan IP Law, LLC; Tina Yin Sowatzke, Esq.

(57) ABSTRACT

A dry food mix described includes a powder mix and particulates. A powder mix contains at least 70% by weight sugars, and includes 40-70% by weight crystalline sucrose, 25-50% by weight crystalline glucose, and a releasing agent. A method described includes making a food by heating, then cooling, a dry food mix to produce the food.

15 Claims, 2 Drawing Sheets

(56) References Cited

OTHER PUBLICATIONS

O.W. Chapman, The Effect of Lecithin in Dairy Products upon Butter Fat Determinations, Jun. 9, 1928, pp. 429-435. (Year: 1928).*

Wong, "*The Thermal Decomposition of Sodium Hydrogen Carbonate (or: Making Honeycomb)*", Catalyst, www.catalyststudent.org.ok, Feb. 2014.

Kweon et al., "*Exploration of Sugar Functionality in Sugar-Snap and Wire-Cut Cookie Baking: Implications for Potential Sucrose Replacement or Reduction*", Cereal Chemistry, No. 86 (4), pp. 425-433, 2009.

Abel + Schafer, "*Komplet Florenta*", https://www.komplet.com/media/attachments/2017/11/0000_KOMPLET%20Florenta%2011036%200717, 2017.

Abel + Schafer, "*Abel and Schafer Florenta Base Instructional Video*", YouTube, https://www.youtube.com/watch?y=fbGZeaM7TMA, Aug. 17, 2009.

\* cited by examiner

DRY FOOD MIX

CROSS REFERENCE TO RELATED APPLICATIONS

This application claims the benefit of U.S. Provisional Patent Application Ser. No. 63/030,667, which was filed on May 27, 2020 and titled "Dry Food Mix". The entire content of this application is incorporated by reference.

BACKGROUND

Instant food products provide consumers a quick way to make a food with little effort and/or time. Instant food products differ from ready-to-eat food products in that they require some preparation to make the desired product, but generally do not require as much preparation as a similar product made from scratch. Instant food products often provide more flexibility than a ready-to-eat food product because they often have a longer shelf life than similar ready-to-eat food products, and consumers can decide when to make them and how much to make at once. Thus, there is a need for new varieties of instant food products to meet consumer needs.

SUMMARY

The present disclosure relates to an instant food product in the form of a dry food mix and methods of making a food using dry food mix.

Provided in an embodiment described herein is a dry food mix that includes 40-70% by weight of a powder mix and 30-60% by weight of heat resistant particulates, where the powder mix contains at least 70% by weight sugars, and includes 40-70% by weight crystalline sucrose, 25-50% by weight crystalline glucose, and a releasing agent.

In some embodiments, a powder mix can contain 50-65% crystalline sucrose and 25-40% crystalline glucose. In some embodiments, a powder mix can include a powdered dairy ingredient. In some embodiments, a powder mix can include powdered honey. In some embodiments, a powder mix can include salt.

In some embodiments, a releasing agent can include powdered palm oil or lecithin.

In some embodiments, heat resistant particulates can include nuts or nut pieces.

Provided in an embodiment described herein is a dry food mix that includes at least 90% by weight of a powder mix containing at least 70% by weight sugars, the powder mix including 40-70% by weight crystalline sucrose, 25-50% by weight crystalline glucose, 0.5-2.5% by weight bicarbonate, and a releasing agent.

In some embodiments, a powder mix can contain an acid salt. In some embodiments, a powder mix can contain 50-65% crystalline sucrose and 25-40% crystalline glucose. In some embodiments, a powder mix can include a powdered dairy ingredient. In some embodiments, a powder mix can include powdered honey. In some embodiments, a powder mix can include salt.

In some embodiments, a releasing agent can include powdered palm oil or lecithin.

Provided in an embodiment described herein is method for making a food. The method includes providing a dry food mix, heating the dry food mix on a baking surface at a temperature of from 300° F. to 400° F. for sufficient time to melt substantially all the crystalline sucrose and substantially all the crystalline glucose to produce a cooked food; and cooling the cooked food to a temperature below 100° F. to produce the food, where the dry food mix includes:
30-60% by weight of heat resistant particulates and 40-70% by weight of a powder mix containing at least 70% by weight sugars, the powder mix including 40-70% by weight crystalline sucrose, 25-50% by weight crystalline glucose, and a releasing agent, or
at least 90% by weight of a powder mix containing at least 70% by weight sugars, the powder mix including 40-70% by weight crystalline sucrose, 25-50% by weight crystalline glucose, 0.5%-2.5% by weight bicarbonate, and a releasing agent.

Provided in an embodiment described herein is method for making a food. The method includes providing a dry food mix, heating the dry food mix on a baking surface at a temperature of from 325° F. to 375° F. for sufficient time to achieve CIELAB color values of the powder mix portion of the dry food mix with an L* value of less than 48, an a* value of at least 6.5, and a b* value of less than 28 to produce a cooked food, and cooling the cooked food to a temperature below 100° F. to produce the food, where the dry food mix includes:
30-60% by weight of heat resistant particulates and 40-70% by weight of a powder mix containing at least 70% by weight sugars, the powder mix including 40-70% by weight crystalline sucrose, 25-50% by weight crystalline glucose, and a releasing agent, or
at least 90% by weight of a powder mix containing at least 70% by weight sugars, the powder mix including 40-70% by weight crystalline sucrose, 25-50% by weight crystalline glucose, 0.5%-2.5% by weight bicarbonate, and a releasing agent.

In many embodiments of a method for making a food described herein, a dry food mix can be heated from about 15 minutes to about 30 minutes.

In many embodiments of a method for making a food described herein, a dry food mix can be heated at a temperature of from 345° F. to 355° F. for a time of from about 20 minutes to about 25 minutes.

In many embodiments of a method for making a food described herein, a powder mix can contain 50-65% crystalline sucrose and 25-40% crystalline glucose.

In many embodiments of a method for making a food described herein, a releasing agent can include powdered palm oil or lecithin.

In many embodiments of a method for making a food described herein, the method can further include breaking the food into pieces.

These and various other features and advantages will be apparent from a reading of the following detailed description.

DETAILED DESCRIPTION

Figure 1:
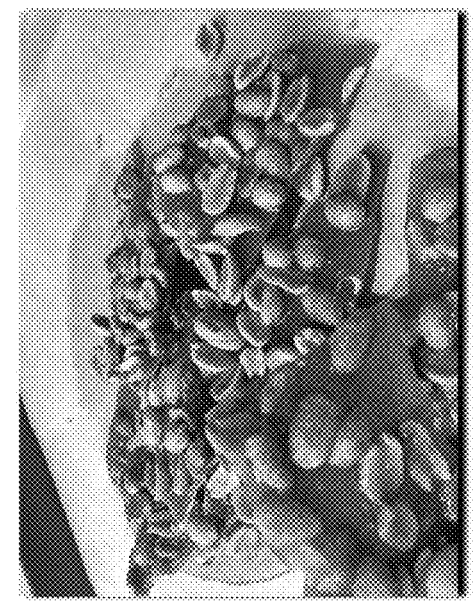
FIG. 1 shows a picture of a peanut brittle like food made using an embodiment of an inventive dry food mix, including a powder mix and peanut pieces. The peanut brittle like food was made by heating and cooling the dry food mix. The picture on the left shows the peanut brittle like food after cooling on a baking sheet. The picture in the center shows the peanut brittle like food being held vertically, showing sufficient thickness and durability to retain particulates (e.g., peanuts) and a semi-transparent glassy appearance resembling peanut brittle. The picture on the right shows the peanut brittle like food after breaking the food into pieces to resemble traditional peanut brittle.
Figure 1:
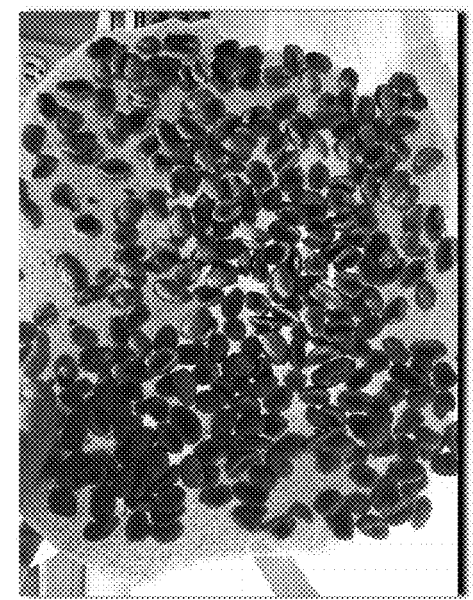
Figure 1:

The present disclosure relates to a dry food mix that can be heated without adding any liquid to produce a peanut brittle like confection. The dry food mix provided herein provides a benefit of being able to be made by a consumer without the need for tools, such as thermometers, and careful observation typically needed to successfully produce confections such as peanut brittle.

Previous dry food mixes have failed to produce foods that have attributes suitable for use as a peanut brittle or similar confections. A dry food mix provided herein spreads less during heating than previous dry food mixes, and thus produces a thicker product that is less fragile and can retain particulates after cooling. For example, a dry food mix provided herein can spread to an area that is less than 70% (e.g., less than 60%, or less than 50%) greater after heating and cooling than before heating and cooling. Further, a dry food mix provided herein can produce a confection similar in color to traditionally made peanut brittle.

As used herein, a dry food mix refers to a combination of powdered ingredients that are shelf stable in moisture-resistant packaging. A dry food mix provided herein need not be combined with a liquid before being heated to prepare a confection.

A dry food mix provided herein includes a powder mix. A powder mix in a dry food mix provided herein is included in an amount of from about 40% to about 100% (e.g., about 40% to about 70%, about 50% to about 70%, or about 55% to about 65%) by weight of the dry food mix. A powder mix includes at least 70% (e.g., at least 80%, at least 90%, about 80% to about 95%, or from about 90% to about 95%) by weight sugars. Sugars in a powder mix provided herein include sucrose in an amount of about 40% to about 70% (e.g., from about 50% to about 65%) by weight of the powder mix, and glucose (i.e., dextrose) in an amount of about 25% to about 50% (e.g., from about 25% to about 40%) by weight of the powder mix. In some embodiments, sucrose and glucose can be included in a powder mix at a ratio of from about 1:1.1 to about 2.5:1 (e.g., from about 1.1:1 to about 2.5:1, or from about 1.4:1 to about 2.3:1) of sucrose to glucose. It is preferred that sucrose and glucose included in a powder mix are in crystalline form rather than amorphous form. A crystalline form may contribute to a desired spread characteristic that achieves a peanut brittle like thickness. In addition, a crystalline form may help achieve a desirable semi-transparent appearance with few bubbles that resembles peanut brittle.

Additional sugars (e.g., monosaccharides or disaccharides, such as galactose, fructose, maltose, lactose, and the like, or any combination thereof) can also be included in a powder mix. In some embodiments, a sugar can be included in a powder mix as part of an ingredient, such as dried honey.

In some embodiments, a powder mix in a dry food mix can also contain a releasing agent. As used herein, a "releasing agent" refers to an ingredient that can facilitate release of a food made from a dry food mix provided herein from a baking surface. As used herein, a "baking surface" refers to a food safe surface that a dry food mix can be heated on, such as a cooking pan (e.g., a frying pan, a griddle, or the like) or a baking pan (e.g., a baking sheet, a cookie sheet, a cake pan, or the like) made from any material suitable for heating to the temperatures described herein (e.g., metal, glass, silicone, coated metals, and the like).

Suitable releasing agents include, for example, fats or oils (e.g., palm oil, sunflower oil, soybean oil, and the like), emulsifiers (e.g., lecithins, mono- and diglycerides, polyglycerol esters, sucrose esters, polysorbates, and the like, or combinations thereof. In some embodiments, a powder mix in a dry food mix can contain up to 10% (e.g., up to about 5%, or up to about 3%) by weight releasing agent. A releasing agent can be included as a powdered ingredient, or can be a liquid applied to other powdered ingredients (e.g., glucose, sucrose, and the like), such as by smizing.

In some embodiments, a dry food mix need not contain a releasing agent. In some embodiments, a releasing agent can be applied to a baking surface to facilitate release of a food made from a dry food mix. Releasing agents suitable for application to a baking surface can include any of those suitable for inclusion in a dry food mix, as well as others, such as a nonstick spray, a silicone mat, parchment paper, wax paper or the like.

In some embodiments, a releasing agent can act as a dust suppressing agent in a dry food mix provided herein. As used herein, a "dust suppressing agent" refers to an ingredient that can reduce dust release of dry ingredients in a dry food mix, e.g., such as when the dry food mix is being manufactured or poured out of a package.

In some embodiments, a powder mix can include 0.5-2.5% by weight of a bicarbonate. A bicarbonate can result in a confection that includes bubbles, which can provide an interesting texture. Suitable bicarbonates include, for example, sodium bicarbonate, ammonium bicarbonate, calcium bicarbonate, and the like, or combinations thereof.

In some embodiments, a powder mix in a dry food mix can include other ingredients, such as a powdered dairy ingredient (e.g., powdered cream, nonfat dry milk, powdered sour cream, and the like, or any combination thereof), a flavorant (e.g., vanilla, cocoa, salt, and the like, or any combination thereof), an acid salt (e.g., cream of tartar, sodium aluminum phosphate, monocalcium phosphate, and the like, or any combination thereof), a colorant, or other appropriate dry ingredient suitable for consumption.

In some embodiments, a dry food mix provided herein includes heat resistant particulates in an amount of about 30% to about 60% (e.g., about 30% to about 45%) by weight of the dry food mix. As used herein, heat resistant particulates refer to particulates that remain intact (e.g., do not combust or lose shape) at a temperature below 400° F. (e.g., below 375° F.). Suitable particulates include, without limitation, nuts (e.g., peanuts, almonds, cashews, walnuts, and the like, or combinations thereof), nut pieces, seeds (e.g., sunflower seeds, pepitas, and the like), seed pieces, heat resistant confections (e.g., candy coated chocolate, cookie pieces), coconut, dried fruits or vegetables, or the like. Nuts and/or nut pieces are particularly suitable for a dry food mix provided herein, as such a dry food mix resembles a nut brittle (e.g., peanut brittle) upon heating.

In some embodiments, a dry food mix provided herein includes particulates that are not heat resistant (e.g., hard candy pieces, chocolate pieces, gummy candy pieces, candy confetti, and the like). Such particulates can melt partially or completely during baking to provide visual and flavor interest.

A dry food mix provided herein can be used in a method of making a food. A method of making a food includes heating a dry food mix provided herein until substantially all the sucrose and substantially all the glucose has melted to produce a cooked food, then cooling the cooked food to produce the food. In some embodiments, a dry food mix can be heated at a temperature of from about 300° F. to about 400° F. (e.g., from about 325° F. to about 375° F., or from about 345° F. to about 355° F.) using any appropriate equipment, such as an oven. In some embodiments, a dry food mix can be heated for a period of time of from about 12 minutes to about 45 minutes (e.g., from about 15 minutes to about 30 minutes, or from about 20 minutes to about 25 minutes). It is to be understand that heating times and temperatures for a method of making a food from a dry food mix provided herein can be adjusted as appropriate to achieve the desired food.

In some embodiments, a dry food mix can be heated at a sufficient temperature and time to achieve melting of substantially all of the sucrose and glucose in the dry food mix. In some embodiments, a dry food mix can simply be watched while being heated to determine the amount of time necessary to achieve melting of substantially all of the sucrose and glucose in the dry food mix.

As used herein, the term "substantially all" with reference to melting of glucose and/or sucrose refers to sufficient loss of crystalline forms of the glucose and/or sucrose such that little or no crystalized glucose and/or sucrose is visible to the naked eye. It is to be understood that, although sucrose does not technically melt, but rather breaks down to form caramel, the term "melt" as used herein with reference to sucrose means that the sucrose loses its crystalline form.

In some embodiments, a dry food mix can be heated at a sufficient temperature and time to achieve a desired color. For example, in some embodiments the powder mix portion of a dry food mix provided herein can achieve CIELAB color values of an L* value of less than 48 (e.g., between 42 and 48, or between 42 and 44), an a* value of at least 6.5 (e.g., between 6.5 and 8), and a b* value of less than 28 (e.g., between 23 and 26, or between 23 and 25).

As used herein CIELAB (also termed CIE L*a*b*) values refers to a set of three color value coordinates, CIELAB L*-value, CIELAB a*-value, and CIELAB b*-value. As used herein, CIELAB measurement is performed by placing a sample (i.e., a section of a food made from a dry food mix, e.g., a piece from a corner, edge, or center) in a container and obtaining a CIELAB L*-value, CIELAB a*-value, and CIELAB b*-value using a Minolta Chroma Meter CR-410. "CIELAB L*-value" refers to lightness or darkness of color in a sample. CIELAB values as measured herein refer to an average over several sections of a food (e.g., (center+4 corners)/5 or (center+4 edge samples)/5). A higher CIELAB L*-value reflects a lighter color, while a lower CIELAB L*-value reflects a darker color. For example, a sample with a CIELAB L*-value of 50 would appear lighter in color than a sample with a CIELAB L*-value of 0, which would appear black. "CIELAB a*-value" refers to the level of red/magenta or green color present in a sample. The lower the CIELAB a*-value, the more green the color. Conversely, the higher the CIELAB a*-value, the more red/magenta the color. For example, a sample with a negative CIELAB a*-value would appear greener than a sample with a positive CIELAB a*-value, which would appear redder. "CIELAB b*-value" refers to the level of yellow or blue color present in a sample. The lower the CIELAB b*-value, the more blue the color. Conversely, the higher the CIELAB b*-value, the more yellow the color. For example, a sample with a negative CIELAB b*-value would appear bluer than a sample with a positive CIELAB b*-value, which would appear yellower.

A method of making a food provided herein includes cooling a cooked food to make the food. Cooling of a cooked food helps to set the structure of the final food to achieve a desired texture of the food (e.g., a texture resembling a nut brittle). Cooling of a cooked food can also help to achieve a structure that retains particulates in the final food. That is, a structure of a food made according to a method provided herein can support inclusions that do not fall out due to gravity without applying an additional force to the food (e.g., breaking the food or chewing the food).

In some embodiments, a cooked food can be cooled to a temperature below 100° F. (e.g., below 90° F., below 85° F., or to about room temperature or below). In some embodiments, a cooked food can be cooled at room temperature to the desired temperature. In some embodiments, a cooked food can be cooled in a chilled environment, such as a refrigerator or freezer. It is to be understood that the amount of time needed to cool a cooked food to produce a food according to a method provided herein can vary based on the final temperature and the temperature at which the cooked food is cooled.

In some embodiments, a method of making a food provided herein can also include breaking the food into pieces. For example, a food can be broken by hand to produce pieces resembling traditional nut brittle. See, for example, FIG. 1.

The following examples describe embodiments of the inventive dry food mix and methods.

EXAMPLES

Example 1

A powder mix suitable for use in an inventive dry food mix, including sucrose, glucose, a releasing agent shown in Table 1 was compared to a commercially available product (Komplet Florenta, Abel & Schafer Komplet Backereigrundstoffe Gmbh & Co. Kg, Volklingen, Germany). Ingredient content of the commercially available product was determined by analytical methods (NA=other ingredients not measured), and is also shown in Table 1.

TABLE 1

| Ingredient | Dry food mix (% by weight) | Commercially available product (% by weight) |
| --- | --- | --- |
| Sucrose | 44-65% | 40-42% |
| Glucose | 28-50% | 2-3% |
| Releasing agent | 2-3% (Palm oil + soy lecithin) | 12-13% (total fats) |
| Other ingredients | 4-5% (flavorants, honey, dairy ingredient) | NA |

As can be seen in Table 1, a powder suitable for use in an inventive dry food mix includes a much higher ratio of glucose to sucrose than the commercially available product. In addition, the amount of releasing agent in a powder suitable for use in an inventive dry food mix is lower than the commercially available product.

150 g of powder mix suitable for use in an inventive dry food mix and commercially available product were each placed on a baking sheet and leveled to form an 8-inch by 8-inch square on the respective product's baking sheet. Each product was heated at 350° F. for 14 minutes, then cooled at room temperature for 30 minutes. The average areas for each product were measured after cooling, and are shown in Table 2. Average thickness after heating and cooling was also measured with a caliper at the approximate center and at each corner, and is shown in Table 2.

TABLE 2

| Measurement | Dry food mix | Commercially available product |
|---|---|---|
| Area before heating | 64 square inches | 64 square inches |
| Dimensions after heating | 71-86 square inches | 116.5 square inches |
| Average increase in area (% increase over area before heating) | 10-35% | 82% |
| Average center thickness | 2.3-2.9 mm | 1.9 mm |
| Average corner thickness | 1.7-2.6 mm | 1.5 mm |
| Average thickness ((center + 4 corners)/5) | 1.8-2.6 mm | 1.6 mm |

As can be seen in Table 2, the average increase in area of a powder mix suitable for use in an inventive dry food mix is 10-35% over the area before heating, or less than half of the increase in area of the commercially available product. It was also observed that the commercially available product produced a thinner layer on its baking sheet than the powder mixes suitable for use in an inventive dry food mix, presumably due to being spread over a larger area after heating and cooling. The commercially available product was too thin and fragile to resemble a peanut brittle, and would not be able to support inclusions, such as nuts.

Figure 2:
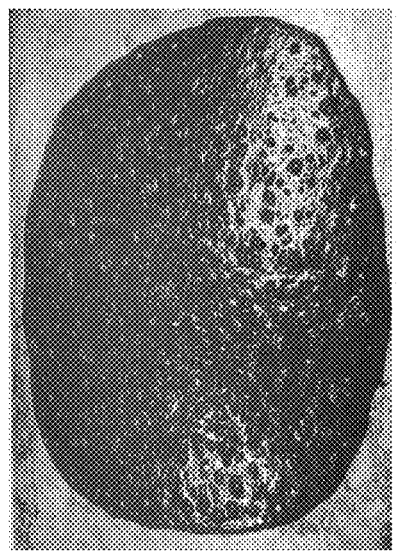
FIG. 2 shows picture of a powder mix of an embodiment of a dry food mix prior to heating and cooling (left) and after heating and cooling (middle). The picture on the right is a commercially available product after heating and cooling.
Figure 2:
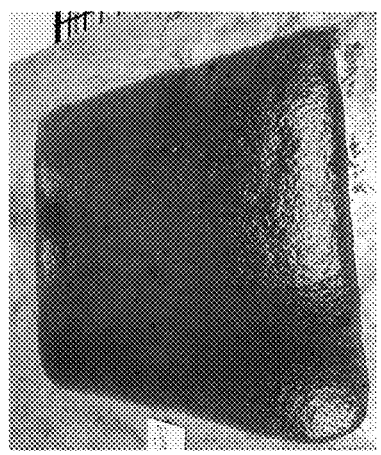
Figure 2:
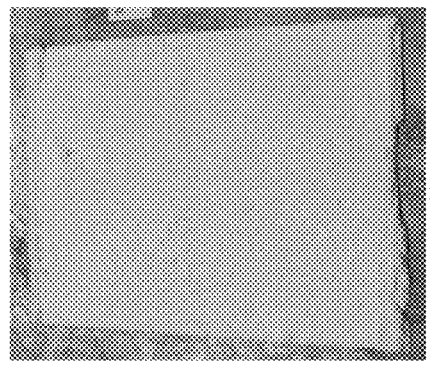

150 g of powder mix suitable for use in an inventive dry food mix and commercially available product were each placed on a baking sheet and leveled to form rectangles with equal dimensions on the respective product's baking sheet. Each product was heated at 350° F. for 14 minutes, then cooled at room temperature for 30 minutes. FIG. 2 shows a representative example of a powder mix suitable for use in an inventive dry food mix before (left) and after heating and cooling (middle), as compared to the commercially available product heated and cooled in the same manner (right). The powder mix suitable for use in an inventive dry mix produced a semi-transparent glassy layer with few bubbles and a brown color, and retained a similar rectangular shape to that formed by the powder mix before heating. In contrast, the commercially available product produced a very bubbly, opaque layer that spread into a rounded shape despite the powder being formed into similar rectangular shape.

Color of a powder mix suitable for use in an inventive dry food mix after heating and cooling was compared to color of the commercially available product after heating and cooling in the same manner by measuring CIELAB L*a*b* values. CIELAB L*-value, CIELAB a*-value, and CIELAB b*-value was measured at the approximate center, and at each corner of each product. Table 3 shows the average ((center+4 corners)/5) of the CIELAB L*-values, CIELAB a*-values, and CIELAB b*-values for each product.

TABLE 3

| Measurement | Dry food mix | Commercially available product |
|---|---|---|
| Average CIELAB L*-value | 42-48 | 49 |
| Average CIELAB a*-value | 6.7-8 | 6.41 |
| Average CIELAB b*-value | 23-26 | 28.3 |

As can be seen in Table 3, powder mix suitable for use in an inventive dry food mix resulted in a product that had a CIELAB L*-value lower than commercially available product, a CIELAB a*-value higher than commercially available product, and a CIELAB b*-value lower than commercially available product. The most preferred samples of a powder mix suitable for use in an inventive dry food mix had a CIELAB L*-value between 42 and 44, a CIELAB a*-value higher between 6.5 and 8, and a CIELAB b*-value between 23 and 25. It was also observed that a powder mix suitable for use in an inventive dry food mix resulted in a product that had far fewer bubbles than the commercially available product. See, FIG. 2.

Example 2

Five different powder mixes suitable for use in an inventive dry food mix, including sucrose, glucose, a releasing agent were compared to a commercially available product (Komplet Florenta, Abel & Schafer Komplet Backereigrundstoffe Gmbh & Co. Kg, Volklingen, Germany) from Example 1. The test samples included the ingredients as shown in Table 1, but with varying sucrose:glucose ratios, as shown in Table 4. The samples were prepared by placing 150 g in an 8 inch by 8 inch square on a baking sheet to limit spread and to provide a thickness of each sample as that is similar. The samples were baked for 14 minutes at 350° F. and then allowed to cool. Once cooled, the samples were scored with a knife and broken into 1 inch by 4 inch strips for texture analysis.

TABLE 4

| Sample | Sucrose:Glucose Ratio |
|---|---|
| 1 | 0.9:1 |
| 2 | 1.1:1 |
| 3 | 1.4:1 |
| 4 | 1.8:1 |
| 5 | 2.3:1 |

A TA-HD plus instrument (Stable Micro Systems, Godalming, United Kingdom) equipped with a 5 kg load cell and a 3-point bend rig set to a 4 cm gap was used to test 12-14 strips for each sample at 2 mm/second. The peak force to break strips of each sample was determined. The results showed that the commercially available product had a significantly higher peak force to break (about 1820 g) than any of the samples from Table 4 (ranging from about 690 g to about 930 g). However, the thickness of the commercially available product strips was also higher (about 3.2 mm) than the test samples from Table 4 (about 2.5 mm to about 2.7 mm). This suggests that the same mass of the commercially available product (150 g) as the powder mixes suitable for use in an inventive dry food mix produced a thicker sheet when spread was limited. The thicker sheet may be due to the bubbles formed in the commercially available product when heated and cooled (see, FIG. 2), and may explain the increased force to break. This suggests that the powder mixes suitable for use in an inventive dry food mix achieves the desired texture and structure that resembles peanut brittle by controlling spread and limiting bubble formation during baking, in contrast to the commercially available product, which does not form a texture or structure suitable for a peanut brittle.

Example 3

The powder mixes described in Example 2 and the commercially available product (Komplet Florenta, Abel &

Schafer Komplet Backereigrundstoffe Gmbh & Co. Kg, Volklingen, Germany) from Example 1 were tested using differential scanning calorimetry (DSC) to predict the thermal properties of the mixes during the baking process. Each sample was tested by placing 10 mg in a non-hermetic pan using a TA DSC2500 calorimeter (TA Instruments, New Castle, Delaware, USA) programmed using the following profile: Segment 1—ramp at 10° C./minute to 155° C.; Segment 2—ramp at 10° C./minute to 21° C.; Segment 3 ramp at 10° C./minute to 200° C.

Based on the DSC analysis, each of the test samples clearly differed from the commercially available product. During Segment 1, each of the test samples showed enthalpic peaks consistent with enthalpic peaks expected when crystalline sugars (sucrose and dextrose) melt, and an enthalpic peak consistent with an enthalpic peak expected when a solid palm oil melts. In contrast, the commercially available product did not produce any enthalpic peaks, suggesting that the sugar components in the commercially available product are in a glassy/amorphous form rather than crystalline form. It is believed that the amorphous sugars included in the commercially available product contributes to excess bubbling and a spread rate that makes it too delicate to retain particulates or resemble a peanut brittle.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed:

1. A method for making a food, the method comprising:
   a. providing a dry food mix, the dry food mix including:
      i. 30-60% by weight of heat resistant particulates and 40-70% by weight of a powder mix containing at least 70% by weight sugars, the powder mix including 40-70% by weight crystalline sucrose, 25-50% by weight crystalline glucose, and a releasing agent, or
      ii. at least 90% by weight of a powder mix containing at least 70% by weight sugars, the powder mix including 40-70% by weight crystalline sucrose, 25-50% by weight crystalline glucose, 0.5%-2.5% by weight bicarbonate, and a releasing agent;
   b. heating the dry food mix on a baking surface including:
      i. at a temperature of from 300° F. to 400° F. for sufficient time to melt substantially all the crystalline sucrose and substantially all the crystalline glucose to produce a cooked food, or
      ii. at a temperature of from 325° F. to 375° F. for sufficient time to achieve CIELAB color values of the powder mix portion of the dry food mix with an L* value of less than 48, an a* value of at least 6.5, and a b* value of less than 28 to produce a cooked food; and
   c. cooling the cooked food to a temperature below 100° F. to produce the food.

2. The method of claim 1, wherein the heating of the dry food mix on the baking surface is performed at the temperature of from 325° F. to 375° F. for sufficient time to achieve CIELAB color values of the powder mix portion of the dry food mix with an L* value of less than 48, an a* value of at least 6.5, and a b* value of less than 28 to produce the cooked food.

3. The method of claim 2, wherein the dry food mix is heated from about 15 minutes to about 30 minutes.

4. The method of claim 2, wherein the dry food mix is heated at the temperature, the temperature being from 345° F. to 355° F., for the time of from about 20 minutes to about 25 minutes.

5. The method of claim 2, wherein the powder mix contains 50-65% by weight of the crystalline sucrose and 25-40% by weight of the crystalline glucose.

6. The method of claim 2, wherein the releasing agent comprises powdered palm oil or lecithin.

7. The method of claim 2, further comprising breaking the food into pieces.

8. The method of claim 1, wherein the dry food mix is heated from about 15 minutes to about 30 minutes.

9. The method of claim 1, wherein the dry food mix is heated at the temperature, the temperature being from 345° F. to 355° F., for the time of from about 20 minutes to about 25 minutes.

10. The method of claim 1, wherein the powder mix contains 50-65% by weight of the crystalline sucrose and 25-40% by weight of the crystalline glucose.

11. The method of claim 1, wherein the releasing agent comprises powdered palm oil or lecithin.

12. The method of claim 1, further comprising breaking the food into pieces.

13. The method of claim 1, wherein the dry food mix is not combined with a liquid before being heated.

14. The method of claim 1, wherein the powder mix includes 40-70% crystalline sucrose by weight of the powder mix and 25-50% crystalline glucose by weight of the powder mix.

15. The method of claim 1, further comprising spreading of the dry food mix during heating, wherein the dry food mix spreads to an area that is less than 70% greater than before heating.

* * * * *